(12) United States Patent
Kitamura et al.

(10) Patent No.: US 8,283,031 B2
(45) Date of Patent: Oct. 9, 2012

(54) SEMICONDUCTIVE FILM, ELECTRIC CHARGE CONTROL MEMBER AND PROCESS FOR PRODUCING THE SEMICONDUCTIVE FILM

(75) Inventors: Hideki Kitamura, Fukushima (JP); Yoshikichi Teramoto, Tokyo (JP); Kazuyuki Suzuki, Fukushima (JP); Naomitsu Nishihata, Tokyo (JP); Yasuhiro Suzuki, Fukushima (JP)

(73) Assignee: Kureha Corporation, Tokyo (JP)

( * ) Notice: Subject to any disclaimer, the term of this patent is extended or adjusted under 35 U.S.C. 154(b) by 624 days.

(21) Appl. No.: 10/574,783

(22) PCT Filed: Oct. 1, 2004

(86) PCT No.: PCT/JP2004/014899
§ 371 (c)(1),
(2), (4) Date: Apr. 6, 2006

(87) PCT Pub. No.: WO2005/033188
PCT Pub. Date: Apr. 14, 2005

(65) Prior Publication Data
US 2007/0020450 A1     Jan. 25, 2007

(30) Foreign Application Priority Data
Oct. 6, 2003  (JP) ................................. 2003-346851

(51) Int. Cl.
*G11B 11/105* (2006.01)
*C04B 35/00* (2006.01)
*C08G 63/00* (2006.01)

(52) U.S. Cl. ......... 428/332; 264/104; 264/105; 525/437

(58) Field of Classification Search .................. 430/530, 430/529, 63, 41, 117.4; 252/511; 399/308; 257/329; 428/220
See application file for complete search history.

(56) References Cited

U.S. PATENT DOCUMENTS

| | | | | | |
|---|---|---|---|---|---|
| 4,895,892 | A | * | 1/1990 | Satake et al. | 524/520 |
| 4,897,238 | A | * | 1/1990 | Kouyama et al. | 264/288.4 |
| 4,937,032 | A | * | 6/1990 | Krone et al. | 264/255 |
| 5,049,340 | A | | 9/1991 | Moss et al. | |
| 5,242,648 | A | * | 9/1993 | Matsumura et al. | 264/235.8 |
| 2002/0183438 | A1 | * | 12/2002 | Amarasekera et al. | 524/495 |

FOREIGN PATENT DOCUMENTS

| | | |
|---|---|---|
| JP | 03-048858 | 7/1989 |
| JP | 03-091556 | 9/1989 |
| JP | 04-101827 | 8/1990 |
| JP | 03-261531 | 12/1990 |
| JP | 04-255332 | 12/1990 |
| JP | 03-261531 | * 11/1991 |
| JP | 07-085722 | 9/1993 |
| JP | 07-090110 | 9/1993 |
| JP | 09-036216 | 7/1995 |
| JP | 11-292999 | 4/1998 |
| JP | 2000-275974 | 3/1999 |

OTHER PUBLICATIONS

Machine Translation of JP 07-085722A, AIPN JPO.*
Translation of JP 07-085722.*
International Search Report.

* cited by examiner

*Primary Examiner* — Angela Ortiz
*Assistant Examiner* — Anthony J Frost
(74) *Attorney, Agent, or Firm* — Porter Wright Morris & Arthur

(57) ABSTRACT

A semiconductive film formed from a resin composition comprising poly(ether ether ketone) and a conductive filler, wherein the average value of its thickness is 30 to 250 μm, the maximum value of the thickness is 1 to 1.3 times as much as the minimum value thereof, the average value of its volume resistivity is $1.0 \times 10^2$ to $1.0 \times 10^{14}$ Ωcm, the maximum value of the volume resistivity is 1 to 30 times as much as the minimum value thereof, and the number of reciprocating folds as determined in accordance with the testing method for folding endurance is at least 5,000 times, and a production process thereof.

16 Claims, No Drawings

SEMICONDUCTIVE FILM, ELECTRIC CHARGE CONTROL MEMBER AND PROCESS FOR PRODUCING THE SEMICONDUCTIVE FILM

TECHNICAL FIELD

The present invention relates to a semiconductive film formed from a resin composition comprising poly(ether ether ketone) (hereinafter abbreviated as "PEEK") and a conductive filler and a production process thereof. The present invention also relates to a charge controlling member formed with this semiconductive film. The semiconductive film according to the present invention is suitable for use in charge control members such as charging belts and transfer belts in image forming apparatus of an electrophotographic system or electrostatic recording system.

BACKGROUND ART

Synthetic resin films having a volume resistivity within a semiconductive range are used in various fields as raw materials of charge controlling members. Typical technical fields, in which the charge controlling members are used, include image forming apparatus such as copying machines, laser beam printers and facsimiles of an electrophotographic system (including an electrostatic recording system).

In, for example, a copying machine of the electrophotographic system, an image is formed by a series of steps including (1) a charging step for uniformly and evenly charging the surface of a photosensitive member, (2) an exposure step for exposing the charged surface of the photosensitive member in a patterned form, thereby forming an electrostatic latent image, (3) a developing step for applying a developer (toner) to the electrostatic latent image on the surface of the photosensitive member to form a visible image (toner image), (4) a transfer step for transferring the toner image on the surface of the photosensitive member to a transfer material (for example, transfer paper or an OHP sheet), (5) a fixing step for fusion-bonding the toner image on the transfer material, (6) a cleaning step for cleaning a remaining toner on the surface of the photosensitive member, and (7) a charge-eliminating step for extinguishing a remaining electric charge on the surface of the photosensitive body.

In such an image forming apparatus, a great number of members respectively having various forms such as belts, rollers, drums and blades are arranged for bearing functions in the above-described respective steps. Examples of such members include a charging member (for example, a charging belt or charging roller), a photosensitive drum (for example, a photosensitive layer and a belt-like or roller-like support for supporting the layer), a developing member (for example, a developing roller or developing belt), a developer layer thickness-controlling member (for example, a toner layer thickness-controlling blade), a transfer member (for example, a transfer belt, intermediate transfer belt or transfer roller), a cleaning member (for example, a cleaning blade), a charge-eliminating member (for example, a charge-eliminating blade, charge-eliminating belt or charge-eliminating roller) and a paper-conveying member. Belt members generally have a form of an endless belt or tube. Roller members are covered rollers with a coating layer of a resin or rubber coated on a roller base.

Since the respective steps described above require to precisely control static electricity or electric charge, many of the members used in the respective steps are required to have moderate conductivity. In a charging system making use of, for example, a charging belt, voltage is applied to the charging belt, and the charging belt is then brought into contact with the surface of a photosensitive member, thereby directly apply an electric charge to the surface of the photosensitive member so as to charge it.

In a developing system making use of a non-magnetic one-component developer, a developing roller is arranged in apposition to a photosensitive member, a toner is applied to the surface of the photosensitive member in a charged state by frictional force between the developing roller and a toner supply roller, this toner is uniformly leveled by a toner layer thickness-controlling blade, and the toner is then transferred to an electrostatic latent image on the surface of the photosensitive member by electric attraction force.

In a transferring system making use of an endless belt, a transfer material is conveyed by the endless belt, an electric charge having a polarity opposite to that of the toner is applied to the endless belt to form an electric field for transfer, whereby the toner image is transferred to the transfer material by Coulomb's force.

Many of such various members as described above are required to have moderate conductivity, more specifically, a volume resistivity within a range of $10^2$ to $10^{14}$ $\Omega$cm, preferably $10^3$ to $10^{14}$ $\Omega$cm at the whole of such members or at least surface layers thereof for developing the respective functions. Since these members are semiconductive, whereby their charge controlling functions can be developed, they may be said to be charge controlling members. In recent years, members formed by a synthetic resin material to which moderate conductivity has been imparted have come to be commonly used as such charge controlling members.

Even in a printer of an ink-jet system, respective stems such as adsorption, conveyance and separation of paper, and cleaning of attached substances are practiced by controlling an electric charge of a paper-conveying member (for example, a belt) or the like, and various kinds of charge controlling members are used therein. Wall paper, sheathing materials for OA apparatus, and the like made of a synthetic resin are also required to have semiconductivity from the viewpoint of anti-dust collection.

A charge controlling member formed by a synthetic resin material is preferably narrow in a scatter of volume resistivity with its location in addition to the fact that it has a volume resistivity within the semiconductive range. The volume resistivity thereof is more preferably substantially even. For example, if a charging belt wide in the scatter of volume resistivity is used, it is impossible to evenly charge the surface of the photosensitive body. If a transfer belt wide in the scatter of volume resistivity is used, it is impossible to exactly transfer the toner image on the surface of the photosensitive body to a transfer material. As a result, it is impossible to obtain an high-quality image.

The charge controlling members formed by the synthetic resin material are required to have high durability. When the charge controlling member is an endless belt, it is driven over a long period of time by at least two rolls. When the member is a roller member, it is rotated at a high speed. Therefore, such charge controlling members require to have sufficiently high durability to withstand such severe driving conditions.

As mechanical properties, both modulus in tension and tensile elongation at break are desirably excellent in particular. For example, if the modulus in tension of a belt is too low, the belt is distorted, so that the durability of the belt itself is impaired, and moreover in the case of an intermediate transfer belt, it forms the cause of distortion and color drift of a toner image transferred on the belt. If the tensile elongation at break of a charge controlling member is too low, its flexibility becomes insufficient, so that its breakage by entrainment of foreign matter, or the like is easy to occur.

Since the charge controlling members are often used in a high-temperature atmosphere, and high voltage of 100 V to several kV or higher may be applied to charge controlling members and the like installed in an electrophotographic copying machine in some cases, they are exposed to the risk of firing by sparks or heating. Therefore, the charge controlling members formed by the synthetic resin material are required to have excellent heat resistance and flame retardancy.

A film formed from a resin composition obtained by dispersing conductive carbon black in a fluorocarbon resin exhibits a volume resistivity within a semiconductive range and is excellent in heat resistance and flame retardancy. However, this film is wide in a scatter of volume resistivity with location and hard to be subjected to incineration disposal after use.

A film formed from a resin composition obtained by dispersing conductive carbon black in a thermoplastic polyester resin involves a problem that creep at 70° C. is high, in addition to the fact that it is wide in a scatter of volume resistivity with location. A belt too high in the creep tends to deform attending on the form of a driving roller and cause image failure by the distortion of the belt. When the charge controlling members or apparatus such as image forming apparatus equipped with the charge controlling members are transported by truck or ship, the temperature in the interior of the truck or ship often becomes high as about 70° C. Therefore, the charge controlling members are required to have a low creep at a high temperature of about 70° C.

The interior of an image forming apparatus such as a copying machine of an electrophotographic system is in a relatively high-temperature state during its operation. The charge controlling members formed by the synthetic resin material require to have heat resistance to the extent that they are neither deformed nor fusion-bonded to any other member under such high-temperature conditions. In particular, tension is applied to belt members such as a transfer belt by at least two driving rolls even during suspension, so that such members require to be small in permanent deformation such as elongation at a high temperature, in other words, extremely low in creep at a high temperature. The heat-resistant temperature required of the charge controlling members varies according to their uses and the design of an apparatus equipped with the charge controlling members. However, it is about 50 to 70° C. in the case of a transfer belt.

A polyimide resin is excellent in various properties such as heat resistance, and films and belts formed from a resin composition obtained by dispersing conductive carbon black in the polyimide resin are known. However, many of polyimide resins are difficult to be subjected to melt extrusion, so that it is necessary to form a film, belt or the like by a wet forming method making use of a varnish containing a polyimide precursor, and so vast production cost is required. A scatter of volume resistivity of a formed product with location is also wide by uneven dispersion of the conductive carbon black in the varnish.

Poly(ether ether ketone) (PEEK) has properties as a non-crystalline polymer in combination by moderately reducing its degree of crystallinity according to the design of a molecular structure though it is a crystalline polymer. In other words, PEEK has excellent chemical resistance, fatigue resistance, toughness, abrasion resistance, slidableness and heat resistance. PEEK is also excellent in creep characteristics at 70° C. Further, PEEK has a high modulus at a high temperature and is excellent in impact resistance and flexing resistance. Further, PEEK exhibits high flame retardancy and scarcely generates smoke and toxic gasses upon its combustion.

Therefore, various kinds of semiconductive molded products making use of PEEK have heretofore been proposed. For example, there have been proposed a base material of a photosensitive member for electrophotography that is obtained by injection-molding a molding material with conductive powder contained in PEEK in the form of a pipe (Japanese Patent Application Laid-Open No. 3-48858), a molded product obtained by press-molding a conductive resin composition with conductive carbon black, graphite and polytetrafluoroethylene to PEEK (Japanese Patent Application Laid-Open No. 3-91556) and a wafer carrier obtained by injection-molding a resin composition with conductive carbon black incorporated into PEEK (Japanese Patent Application Laid-Open No. 9-36216).

However, it has been extremely difficult to produce a semiconductive film, which has an even thickness and is narrow in a scatter of volume resistivity with location and excellent in mechanical strength, using a resin composition with a conductive filler added to PEEK.

For example, a biaxially stretched film can be produced by biaxially stretching a non-crystalline PEEK sheet (Japanese Patent Application Laid-Open No. 4-101827). When the resin composition with the conductive filler added to PEEK is used to form a non-crystalline sheet, and the non-crystalline sheet is biaxially stretched, however, the sheet is broken upon the stretching, so that it is extremely difficult to produce a satisfactory biaxially stretched film. When the resin composition containing PEEK and the conductive filler is also used to produce a uniaxially stretched or biaxially stretched film, the resultant film tends to become wide in a scatter of volume resistivity with location.

It is known to obtain a non-crystalline or crystalline PEEK film by drawdown. When a resin composition with a conductive filler dispersed in PEEK is used to produce a semiconductive film by the drawdown method, however, it is difficult to control the thickness of the resulting semiconductive film evenly, and moreover the semiconductive film tends to be easily tore in its flowing direction. Further, according to this method, the volume resistivity of the resulting semiconductive film is liable to be uneven due to molecular orientation of PEEK.

For example, there has been proposed a process for producing a tubular film by using a resin composition with 2 kinds of conductive carbon black, which are different in DBP oil absorption, added to PEEK under conditions of a spiral die temperature of 385° C. and an internal cooling temperature of 20° C. (Japanese Patent Application Laid-Open Nos. 7-85722 and 7-90110). However, it is difficult to obtain a semiconductive film having an even thickness under such film-forming conditions. The resultant semiconductive film also tends to be tore in its flowing direction.

There has been proposed a process in which a resin composition with conductive carbon black added to PEEK is formed in the form of a tube by extrusion, and the extrudate is immediately cooled (Japanese Patent Application Laid-Open No. 2000-275974). However, it is difficult to control so as to give an even thickness even according to this process, and the resultant semiconductive film is wide in a scatter in volume resistivity with location and tends to be tore in its flowing direction.

DISCLOSURE OF THE INVENTION

It is an object of the present invention to provide a semiconductive film that is formed from a resin composition comprising poly(ether ether ketone) and a conductive filler, narrow in scatters of both thickness and volume resistivity and markedly excellent in folding endurance (flexing resistance), and a production process thereof.

Another object of the present invention is to provide a semiconductive film that is formed from a resin composition comprising poly(ether ether ketone) and a conductive filler, excellent in modulus in tension, tensile elongation and tensile strength in addition to the above-described properties, free of anisotropy in tear strength in its forming direction and also good in heat resistance and flame retardancy, and a production process thereof.

A further object of the present invention is to provide a charge controlling member such as a belt or covered roller formed from the above-described semiconductive film having excellent properties.

The present inventors have carried out an extensive investigation with a view toward overcoming the above-described problems. As a result, the inventors have conceived a process in which a resin composition comprising PEEK and a conductive filler is fed to an extruder and melt-extruded in the form of a film from a T-die or ring die, the lip clearance of which has been controlled to at most 1.0 mm, while controlling the temperature of the resin composition within a range of 350 to 410° C., and the resultant film in the molten state is cooled and solidified by a cooling roll or cooling mandrel controlled to a temperature within a range of 60 to 120° C.

In particular, it is important from the viewpoint of providing a semiconductive film having various properties highly balanced among them to control the lip clearance of the die narrow and cool and solidify the melted film extruded from the die by the cooling roll or cooling mandrel controlled to a moderately high temperature without quenching it. According to the production process of the present invention, a semiconductive film excellent in such various properties as described above can be obtained. The present invention has been led to completion on the basis of these findings.

According to the present invention, there is thus provided a semiconductive film formed from a resin composition comprising poly(ether ether ketone) and a conductive filler in a proportion of 5 to 40 parts by weight per 100 parts by weight of the poly(ether ether ketone), wherein the semiconductive film has the following properties (a) to (c):

(a) the average value of its thickness being within a range of 30 to 250 μm, and the maximum value of the thickness being within a range of 1 to 1.3 times as much as the minimum value thereof, (b) the average value of its volume resistivity being within a range of $1.0 \times 10^2$ to $1.0 \times 10^{14}$ Ωcm, and the maximum value of the volume resistivity being within a range of 1 to 30 times as much as the minimum value thereof, and (c) the number of reciprocating folds required up to cutting as determined by using a strip-like specimen having a width of 15 mm under conditions of a chuck bending angle of 135° right and left, a folding speed of 175 c/s and a load of 9.8 N per 100 μm of a thickness in accordance with "Testing Method for Folding Endurance by MIT Tester" as prescribed in JIS P 8115 being at least 5,000 times.

According to the present invention, there is also provided a charge controlling member formed with the semiconductive film described above.

According to the present invention, there is further provided a process for producing a semiconductive film, which comprises feeding a resin composition comprising poly(ether ether ketone) and a conductive filler in a proportion of 5 to 40 parts by weight per 100 parts by weight of the poly(ether ether ketone) to an extruder, melt-extruding the resin composition in the form of a film from a T-die, the lip clearance of which has been controlled to at most 1.0 mm, while controlling the temperature of the resin composition within a range of 350 to 410° C., and then bringing the film in the molten state into contact with a cooling roll controlled to a temperature within a range of 60 to 120° C. to cool and solidify the film.

According to the present invention, there is still further provided a process for producing a semiconductive film, which comprises feeding a resin composition comprising poly(ether ether ketone) and a conductive filler in a proportion of 5 to 40 parts by weight per 100 parts by weight of the poly(ether ether ketone) to an extruder, melt-extruding the resin composition in the form of a tubular film from a ring die, the lip clearance of which has been controlled to at most 1.0 mm, while controlling the temperature of the resin composition within a range of 350 to 410° C., and then cooling and solidifying the tubular film in the molten state through a cooling mandrel controlled to a temperature within a range of 60 to 120° C.

BEST MODE FOR CARRYING OUT THE INVENTION

1. Poly(Ether Ether Ketone) (PEEK)

The poly(ether ether ketone) (PEEK) used in the present invention is preferably a homopolymers having a structural unit (repeating unit) represented by the following formula (1):

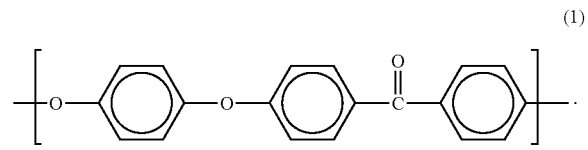

As PEEK, may also be used a copolymer having the structural unit represent by the formula (1), a structural unit represented by the following formula (2):

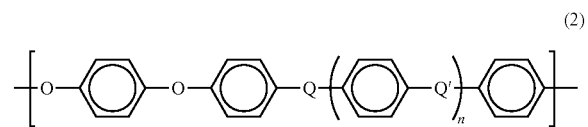

wherein Q and Q' may be the same or different from each other and are individually —CO— or —SO$_2$—, and n is 0 or 1, and/or a structural unit represented by the following formula (3):

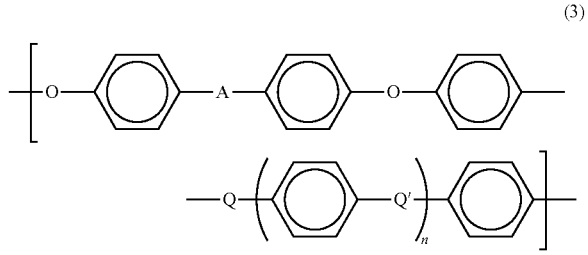

wherein A is a divalent lower aliphatic hydrocarbon group, Q and Q' may be the same or different from each other and are individually —CO— or —SO$_2$—, and n is 0 or 1. A proportion of the structural units represented by the formulae (2) and (3) in the copolymer is generally at most 50 mol %, preferably at most 20 mol %, more preferably at most 10 mol %.

The PEEKs may be used either singly or in any combination of two or more thereof. Typical examples of commercially available products thereof include "Victrex PEEK" series (trade name, products of Victrex Co.). Among these, "Victrex PEEK 450G" is mentioned as a grade particularly preferred for use in the present invention.

2. Conductive Filler

No particular limitation is imposed on the conductive filler used in the present invention, and examples thereof include conductive carbon black, graphite powder, metal powders and metal oxide whiskers the surfaces of which have been subjected to a conductivity-imparting treatment. Among these, conductive carbon black is particularly preferred from the viewpoints of easy control of volume resistivity and mechanical properties.

No particular limitation is imposed on the conductive carbon black used in the present invention so far as it has conductivity, and as examples thereof, may be mentioned acetylene black, oil furnace black, thermal black and channel black. Among these, acetylene black and oil furnace black that are carbon black of a typical conductive grade are preferred. These conductive carbon black fillers may be used either singly or in any combination of two or more thereof.

The DBP oil absorption of the conductive carbon black is within a range of generally 30 to 700 ml/100 g, preferably 80 to 500 ml/100 g, more preferably 100 to 400 ml/100 g. If the DBP oil absorption of the conductive carbon black is too low, it is difficult to control the volume resistivity of the resulting semiconductive film within a desired semiconductive range. If the oil absorption is too high, such carbon black tends to become bad in dispersion in PEEK. At least 2 kinds of conductive carbon black, which are different in DBP oil absorption, may also be used in combination.

The DBP oil absorption means an amount (ml) of oil absorbed in 100 g of the conductive carbon black and can be measured by means of a Dibutyl Phthalate Absorptometer. More specifically, the DBP oil absorption can be measured in accordance with the method prescribed in ASTM D2414. The conductive carbon black is placed in a chamber of a measuring apparatus (Absorptometer), and DBP (n-dibutyl phthalate) is added to the chamber at a fixed rate. The viscosity of the conductive carbon black increases as it absorbs DBP, and the DBP oil absorption is calculated out on the basis of an amount of DBP absorbed up to the time the viscosity has reached a certain degree. The detection of the viscosity is conducted by means of a torque sensor.

The content of volatile matter in the conductive carbon black is preferably at most 1.5% by weight, more preferably at most 1.0% by weight, particularly preferably at most 0.5% by weight. The volatile matter means gases desorbed upon heating at 950° C. The specific surface area of the conductive carbon black as determined by nitrogen absorption is generally 50 to 2,000 m$^2$/g.

A proportion of the conductive filler incorporated varies according to the kind of the conductive filler used. However, it is 5 to 40 parts by weight, preferably 5 to 30 parts by weight, more preferably 6 to 20 parts by weight per 100 parts by weight of PEEK. If the proportion of the conductive filler incorporated is too high, the volume resistivity of the resulting semiconductive film may become too low or its mechanical properties may be deteriorated in some cases. If the proportion of the conductive filler incorporated is too low, it is difficult to control the volume resistivity of the resulting semiconductive film within a desired semiconductive range.

In the case of conductive carbon black high in DBP oil absorption and low in the content of volatile matter, for example, oil furnace black, good results can be gained even when the proportion of the conductive carbon black incorporated is of the order of preferably 5 to 15 parts by weight, more preferably 6 to 10 parts by weight per 100 parts by weight of PEEK.

The volume resistivity of the conductive filler used in the present invention is preferably lower than $10^2$ Ωcm, more preferably lower than 10 Ωcm. If the volume resistivity of the conductive filler is too high, it is difficult to control the volume resistivity of the resulting semiconductive film within a desired semiconductive range. The lower limit of the volume resistivity of the conductive filler is generally the volume resistivity of a metallic material such as metal powder or metal fiber.

The particle diameter ($d_{50}$) of the conductive filler used in the present invention is desirably sufficiently smaller than the thickness of the resulting semiconductive film. The particle diameter of the conductive filler is preferably smaller than 50 μm, more preferably smaller than 10 μm, particularly preferably smaller than 1 μm. If the particle diameter of the conductive filler is too great, short circuit is easy to occur between front and back surfaces of the resulting semiconductive film, and the surface smoothness of this film is liable to be impaired.

3. Other Thermoplastic Resins

Into the resin composition used for forming the semiconductive film according to the present invention, other thermoplastic resins may be incorporated within a range of small amounts that no detrimental influence is thereby imposed on the above-described objects of the present invention.

As other thermoplastic resins, are preferred thermoplastic resins stable at a high temperature. As specific examples thereof, may be mentioned poly(arylene sulfide) resins such as poly(phenylene sulfide); thermoplastic polyester resins such as polyethylene terephthalate and polybutylene terephthalate; fluorocarbon resins such as polytetrafluoroethylene, tetrafluoroethylene/hexafluoropropylene copolymers, tetrafluoroethylene/perfluoroalkyl vinyl ether copolymers, polychlorotrifluoroethylene, polyvinylidene fluoride, vinylidene fluoride/hexafluoropropylene copolymers, propylene/tetrafluoroethylene copolymers, vinylidene fluoride/chlorotrifluoroethylene copolymers and ethylene/hexafluoropropylene copolymers; and besides polyacetal, polystyrene, polyamide, polycarbonate, poly(phenylene ether), polyether imide, poly(alkyl acrylate), ABS resins and polyvinyl chloride.

These thermoplastic resins may be used either singly or in any combination of two or more thereof. The other thermoplastic resins are used within a range of small amounts that no detrimental influence is thereby imposed on the various properties of PEEK. A proportion of the other thermoplastic resins incorporated is preferably at most 30 parts by weight, more preferably 10 parts by weight, particularly preferably at most 5 parts by weight per 100 parts by weight of PEEK.

4. Filler

Various kinds of filler may be incorporated into the resin composition used for forming the semiconductive film according to the present invention as needed.

Examples of the fillers include fibrous fillers, such as inorganic fibrous materials such as glass fiber, carbon fiber, asbestos fiber, silica fiber, alumina fiber, zirconia fiber, boron nitride fiber, silicon nitride fiber, boron fiber and potassium titanate fiber; fibrous materials of metals such as stainless steel, aluminum, titanium, steel and brass; and fibrous materials of high-melting organic substances such as polyamide, fluorocarbon resins, polyester resins and acrylic resins.

As examples of non-fibrous fillers, may be mentioned particulate or powdery fillers of mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, barium sulfate and the like.

Among these fillers, are preferred non-conductive particulate or powdery fillers. These fillers may be used either singly or in any combination of two or more thereof. The fillers may be treated with greige goods or surface-treating agents as needed. Examples of the greige goods or surface-treating agents include functional compounds such as epoxy compounds, isocyanate compounds, silane compounds and titanate compounds. These compounds may be used for conducting a surface treatment or collecting treatment to the fillers in advance or added at the same time as the fillers upon the preparation of the resin composition.

A proportion of the fillers incorporated is within a range of generally 0 to 100 parts by weight, preferably 0 to 30 parts by weight, more preferably 0 to 10 parts by weight, particularly preferably 0 to 5 parts by weight per 100 parts by weight of the resin component.

The particle diameter of the fillers is desirably sufficiently smaller than the thickness of the resulting film. The particle diameter of the fillers is preferably smaller than 50 µm, more preferably smaller than 10 µm, particularly preferably smaller than 1 µm. If the particle diameter of the fillers is too great, the surface smoothness of the resulting semiconductive film is liable to be impaired.

5. Other Additives

Other additives than those described above may be incorporated into the resin composition used for forming the semiconductive film according to the present invention as needed.

As other additives, may be suitably added, for example, resin modifiers such as ethylene glycidyl methacrylate, lubricants such as pentaerythritol tetrastearate, thermosetting resins, antioxidants, ultraviolet absorbents, nucleating agents such as boron nitride, flame retardants such as red phosphorus powder, and colorants such as dyes and pigments. However, the additives are not limited thereto.

6. Semiconductive Film

In the semiconductive film according to the present invention, the average value of its thickness is within a range of 30 to 250 µm, preferably 40 to 150 µm, more preferably 45 to 100 µm. If the thickness of the semiconductive film is too small, it is difficult to make the thickness of the film even. If the thickness is too great, the flexibility of such a film is deteriorated.

In order for a charge controlling member formed with the semiconductive film according to the present invention to uniformly exhibit a charge controlling function, it is desirable that a scatter of thickness of the film is narrow. More specifically, in the semiconductive film according to the present invention, the maximum value of the thickness is within a range of 1 to 1.3 times, preferably 1 to 1.2 times, more preferably 1 to 1.1 times as much as the minimum value thereof. Measuring methods of the average value and scatter of the thickness of the semiconductive film are as shown in Examples which will be described subsequently.

In the semiconductive film according to the present invention, the average value of its volume resistivity is within a range of $1.0 \times 10^2$ to $1.0 \times 10^{14}$ Ωcm, preferably $1.0 \times 10^3$ to $1.0 \times 10^{14}$ Ωcm, more preferably $1.0 \times 10^4$ to $1.0 \times 10^{14}$ Ωcm. When a charge controlling member composed of the semiconductive film according to the present invention is used as a covering tube for a developer-carrying member, a covering tube for a photosensitive belt or roll, or a covering tube or blade for a charge-eliminating belt or roll, the volume resistivity (average value) thereof is within a range of preferably $1.0 \times 10^3$ to $1.0 \times 10^9$ Ωcm, more preferably $1.0 \times 10^3$ to $1.0 \times 10^6$ Ωcm.

When the charge controlling member composed of the semiconductive film according to the present invention is used as a paper-conveying belt, the average value of the volume resistivity thereof is within a range of preferably $1.0 \times 10^8$ to $1.0 \times 10^{14}$ Ωcm, more preferably $1.0 \times 10^{10}$ to $1.0 \times 10^{13}$ Ωcm.

When the charge controlling member composed of the semiconductive film according to the present invention is used as a covering tube for a transfer belt or roll, or a covering tube or blade for a charging belt or roll, the average value of the volume resistivity thereof is within a range of preferably $1.0 \times 10^5$ to $1.0 \times 10^{13}$ Ωcm, more preferably $1.0 \times 10^7$ to $1.0 \times 10^{11}$ Ωcm.

In order for a charge controlling member formed with the semiconductive film according to the present invention to uniformly exhibit a charge controlling function, it is desirable that a scatter of volume resistivity of the semiconductive film with location is narrow. More specifically, in the semiconductive film according to the present invention, the maximum value of the volume resistivity thereof is within a range of 1 to 30 times, preferably 1 to 10 times, more preferably 1 to 5 times as much as the minimum value thereof. Measuring methods of the average value and scatter of the volume resistivity of the semiconductive film are as shown in Examples which will be described subsequently.

In the semiconductive film according to the present invention, the number of reciprocating folds required up to cutting as determined by using a strip-like specimen having a width of 15 mm under conditions of a chuck bending angle of 135° right and left, a folding speed of 175 c/s and a load of 9.8 N per 100 µm of a thickness in accordance with "Testing Method for Folding Endurance by MIT Tester" as prescribed in JIS P 8115 is at least 5,000 times, preferably at least 10,000 times, more preferably at least 20,000 times.

The semiconductive film according to the present invention can be used to form a transfer belt. A transfer belt arranged in an image forming apparatus is generally longer than the width of a driving roller, and meandering-preventing ribs are bonded to portions protruding from the driving roller. Therefore, the transfer belt may undergo flexural movement at edge portions of the roller and bonded portions of the meandering-preventing ribs in some cases when the transfer belt is rotated. Accordingly, the transfer belt desirably has strong folding endurance. If the number of reciprocating folds in the test for folding endurance of the semiconductive film is too small, it is impossible to form a belt having sufficient folding endurance.

The tensile elongation at break of the semiconductive film according to the present invention in any direction is preferably at least 10%, more preferably at least 50%, still more preferably at least 100% and often at least 200%. The tensile elongation at break can be measured by using a specimen having a width of 10 mm and a length of 100 mm under conditions of a crosshead speed of 50 mm/min and an interchuck interval of 50 mm by means of a tensile tester in accordance with JIS K 7113. The tensile elongation at break in any direction generally means a value measured in a machine direction (MD) or in a transverse direction (TD) perpendicular thereto. MD is an extruding direction upon forming of a film, and TD is a direction (width direction) perpendicular to the extruding direction.

If the tensile elongation at break of the semiconductive film in any direction is too small, the durability of the film is deteriorated. If the tensile elongation at break of the semiconductive film is too small, the flexibility of a charge controlling member such as a belt or covered roller formed from such a semiconductive film becomes insufficient, and its breakage by entrainment of foreign matter, or the like is easy to occur.

When the belt formed with the semiconductive film according to the present invention is used as a transfer belt, and the belt is distorted, it forms the cause of distortion and color drift of a toner image formed on the belt. Therefore, such a belt requires to have a sufficiently high modulus. The modulus in tension of the semiconductive film according to the present invention in any direction is at least 1.8 GPa, and preferably within a range of 1.8 to 4.0 GPa, more preferably 2.0 to 3.0 GPa, particularly preferably 2.2 to 2.8 GPa. This modulus in tension can be measured by using a specimen having a width of 10 mm and a length of 100 mm under conditions of a crosshead speed of 50 mm/min and an inter-chuck interval of 50 mm by means of a tensile tester in accordance with JIS K 7113. The any direction is generally MD or TD.

In the semiconductive film according to the present invention, a ratio (M/T) of tear strength (M) in the extruding direction (MD) of the film to tear strength (T) in a direction (TD) perpendicular to the extruding direction as determined in accordance with JIS K 6252 is within a range of preferably 2/3 to 3/2, more preferably 3/4 to 4/3, particularly preferably 5/6 to 6/5.

When the belt formed with the semiconductive film according to the present invention is used as a transfer belt, and the tear strength of the belt in a specific direction is low, the belt tends to cause fissure or be broken from its weak direction. The semiconductive film according to the present invention is substantially free of anisotropy in tear strength in its forming direction.

The semiconductive film according to the present invention is preferably such that an endothermic peak is detected within a range of 150 to 200° C. by thermal analysis by means of a differential scanning calorimeter (DSC) and the endothermic peak indicates a crystallization endotherm ΔH (crystallization enthalpy) of at least 10 J/g.

The semiconductive film according to the present invention is desirably low in the degree of crystallinity of PEEK. If the degree of crystallinity of PEEK becomes too high, such a semiconductive film tends to become high in modulus in tension but brittle on the other hand. The degree of crystallinity of semiconductive film can be judged by the crystallization endotherm of the film, which is detected by the thermal analysis by means of DSC. In the semiconductive film according to the present invention, an endothermic peak having a crystallization endotherm (ΔH) of preferably at least 10 J/g, more preferably at least 15 J/g, particularly preferably at least 20 J/g is detected within a range of 150 to 200° C. by the thermal analysis by means of DSC.

The semiconductive film according to the present invention is excellent in flame retardancy and exhibits high flame retardancy of preferably at least VTM-2, more preferably at least VTM-1, particularly preferably at least VTM-0 by a UL94 VTM flammability test.

7. Production Process of Semiconductive Film

The resin composition used for forming the semiconductive film according to the present invention can be prepared by using any method and equipment.

For example, individual raw components are premixed by a mixer such as a Henschel mixer or tumbler, a filler such as glass fiber is added to the premix, if necessary, to further mix their components, and the resultant mixture is then kneaded by means of a single-screw or twin-screw extruder and extruded, whereby pellets for molding or forming can be prepared. There may also be adopted a method in which part of the necessary components are used to prepare a masterbatch, and the masterbatch is mixed with the remaining components. In order to enhance the dispersibility of each raw component, it is also possible that part of raw materials used are ground to make the particle diameters of the components uniform, and they are mixed and melt-extruded.

In the process according to the present invention for producing the semiconductive film, a resin composition containing a conductive filler in a proportion of 5 to 40 parts by weight per 100 parts by weight of PEEK is fed to an extruder and melt-extruded in the form of a film from a T-die or ring die, the lip clearance of which has been controlled to at most 1.0 mm, while controlling the temperature of the resin composition within a range of 350 to 410° C. In the case where the ring die is used, a tubular film is melt-extruded. The film in the molten state is then brought into contact with a cooling roll controlled to a temperature within a range of 60 to 120° C. to cool and solidify it. The tubular film is cooled and solidified through a cooling mandrel controlled to a temperature within a range of 60 to 120° C.

In the present invention, a continuous melt-extrusion process is preferred. As the continuous melt-extrusion process, may be adopted a process in which a single-screw or twin-screw extruder and a T-die are used to extrude the resin composition in a molten state just under the die from its lip, and the extrudate is cooled and solidified while bringing it into close contact with a cooling roll by an air-knife or the like. As a continuous melt-extrusion process desired to form a seamless belt, is mentioned a process in which a single-screw extruder and a spiral annular die (ring die) are used to extrude the resin composition just under the die from its lip, and the extrudate is taken off while controlling its inner diameter by an internal cooling mandrel system.

The temperature (resin temperature) of the resin composition within the extruder is within a range of 350 to 410° C., preferably 360 to 400° C., more preferably 370 to 395° C. This resin temperature may be represented by a die temperature.

The lip clearance of the T-die or ring die is at most 1.0 mm, preferably at most 0.7 mm, more preferably at most 0.6 mm, particularly preferably at most 0.5 mm. The lower limit of the lip clearance is generally 0.1 mm and often 0.2 mm.

The resin composition in the molten state, which has been drawn down from the die lip, is taken off to form a film (including a tubular film). At this time, the take-off speed is controlled to adjust the thickness of the film to a desired thickness. The lip clearance is made small, whereby deformation of the film in the molten state can be lessened to provide a semiconductive film little in irregularities of thickness and volume resistivity and free of anisotropy in mechanical properties.

The temperature of the cooling roll or cooling mandrel with which the film (including a tubular film) in the molten state is brought into contact upon its cooling is within a range of 60 to 120° C., preferably 70 to 100° C., more preferably 80 to 90° C. If the cooling temperature is too high, the crystallization of the resin is advanced, and the resulting semiconductive film tends to become brittle. If the cooling temperature is too low, the cooling becomes uneven, so that it is difficult to provide a semiconductive film having good smoothness.

The semiconductive film according to the present invention is excellent in high-temperature rigidity at 150° C. or higher, flame retardancy, heat resistance, chemical resistance, dimensional stability and mechanical properties and used in a wide variety of fields of which these various properties are required.

8. Charge Controlling Member

The semiconductive film according to the present invention can be formed in the form of a tube. The semiconductive tubular film can be used as a charge controlling member such as a transfer belt in the form of a seamless belt. A roller base is also covered with the tube, whereby a semiconductive covered roller can be produced.

When the semiconductive film is a flat film, the semiconductive film is subjected to secondary processing, whereby various kinds of charge controlling members can be formed. A process thereof is formation of an endless belt or tube by heat-seaming the semiconductive film. When the semiconductive film according to the present invention is bonded to each other by heat seaming to form a belt, a position (remelted position) of the sheet heated may be either a part of the sheet or the whole thereof.

A belt base (for example, a belt composed of a polyimide film) formed from another material is covered with the semiconductive film according to the present invention, whereby a laminated belt can be formed. The semiconductive film according to the present invention may also be laminated on any other conductive sheet or/and semiconductive sheet to provide a laminate of 2 or more layers. The lamination may be conducted by either sticking interfaces between respective layers with an adhesive or forming a multi-layer film or sheet by co-extrusion.

Further, a roller base (for example, a core metal) is covered with the semiconductive film according to the present invention, whereby a covered roller can be formed. The surface of the semiconductive film or charge controlling member according to the present invention may be subjected to coating with another resin, vapor deposition with a metal or matting processing as necessary for the end application intended.

EXAMPLES

The present invention will hereinafter be described more specifically by the following Examples and Comparative Examples. Physical properties and properties or characteristics in the present invention were determined in accordance with the following respective methods.

(1) Thickness:

The thickness of each molded or formed product sample was measured by a dial gauge thickness meter (DG-911, trade name, manufactured by Ono Sokki K.K.).

(2) Volume Resistivity:

In the present invention, with respect to a sample having a volume resistivity not lower than $10^8$ Ωcm, the sample was held between a ring probe (URS Probe, trade name, manufactured by Mitsubishi Chemical Corporation; outer diameter of an inner electrode: 5.9 mm; inner diameter of an outer electrode: 11.0 mm; outer diameter of the outer electrode: 17.8 mm) and a measuring stage (Resitable UFL, trade name, manufactured by Mitsubishi Chemical Corporation) to press the sample under a pressure of about 3 kg, and voltage of 100 V was applied between the inner electrode of the probe and the measuring stage to determine a volume resistivity of the sample by a resistivity meter (Hirestor UP, trade name, manufactured by Mitsubishi Chemical Corporation).

In the present invention, with respect to a sample having a volume resistivity lower than $10^8$ Ωcm, its volume resistivity was determined in the same manner as in the sample having a volume resistivity not lower than $10^8$ Ωcm except that the voltage applied was changed to 10 V.

The details of the volume resistivity measuring method by such a ring electrode method are prescribed in JIS K 6911.

(3) Calculation of Average Value and Scatter:

In the above-described measurements of the thickness and volume resistivity, the measurements were conducted at optionally selected 20 measuring points per $m^2$ of the surface area of a sample to be measured to find the maximum values, minimum values and average values (arithmetic mean) thereof. A scatter was found by calculating out a value of the maximum value/the minimum value.

With respect to molded or formed samples formed with the semiconductive film, there can be adopted a method in which the measurements were conducted at one measuring point (20 points in total) per one of optionally selected 20 molded or formed products to find the maximum values, minimum values and average values (arithmetic mean) thereof.

(4) Modulus in Tension and Tensile Elongation at Break:

The measurement was conducted by using a strip-like specimen having a width of 10 mm and a length of 100 mm under conditions of a crosshead speed of 50 mm/min and an interchuck interval of 50 mm by means of a tensile tester (TENSILON RTM100 Model, manufactured by Orientex K.K.) in accordance with JIS K 7113. The measurement was conducted on 5 specimens (n=5) every sample to calculate out its arithmetic mean.

(5) Tear Strength:

The tear strength was evaluated by using a trouser type specimen at a chuck-moving rate of 100 m/min in accordance with JIS K 6252. The measurement was conducted on 5 specimens (n=5) every sample to calculate out its arithmetic mean.

(6) Fold Endurance Test:

The number of reciprocating folds required up to cutting was counted by using a strip-like specimen having a width of 15 mm under conditions of a chuck bending angle of 135° right and left, a folding speed of 175 c/s (cycle/sec) and a load of 9.8 N per 100 μm of a thickness in accordance with the testing method for folding endurance by MIT tester as prescribed in JIS P 8115.

In the MIT tester (tester for measuring the folding endurance of cloth), the fold number, i.e., the number of reciprocating folds required until a specimen such as paper or paperboard is cut is counted, thereby evaluating the folding endurance. In the present invention, this measuring method is adopted.

The load 9.8 N per 100 μm of the thickness is changed in proportion as the thickness of a film sample varies. For example, when the thickness of the film sample is 50 μm, the load is changed to 4.9 N. The measurement was conducted on 5 specimens (n=5) every sample to calculate out its arithmetic mean.

(7) Differential Scanning Calorimetry (DSC):

The measurement of each film sample was conducted by using a differential scanning calorimeter (DSC30, trade name, manufactured by Mettler Instrument AG) and a data processor (TC10A, trade name, manufactured by Mettler Instrument AG) under the following conditions in accordance with the DSC method. The measurement was conducted after the sample was conditioned at 75° C. for 10 hours. A crystal melting peak temperature and ΔH were found by a first run. The measuring conditions were as follows:

sample weight=10 mg,
measurement starting temperature=30° C.,
measurement completing temperature=400° C., and
heating rate=10° C./min.

Example 1

In a Henschel mixer, 94.0 parts by weight of poly(ether ether ketone) (product of Victrex Co., trade name "Victrex PEEK 450G") and 6.4 parts by weight of conductive carbon black (oil furnace black, product of Ketjen Black International, trade name "Ketjen Black EC", volatile matter=0.5%, DBP oil absorption=360 ml/100 g, pH=9) were uniformly dry-blended. The resultant blend was then fed to a twin-screw kneader extruder (PCM-46, manufactured by Ikegai Corp.) having a barrel diameter of 45 mm, kneaded at a cylinder temperature of 260 to 385° C., and melted and extruded, thereby forming pellets.

The thus-formed pellets were fed to a singly-screw extruder and melt-extruded in the form of a film from a T type die (T-die) having a lip clearance of 0.5 mm at a die temperature (resin temperature) of 390° C., and the film in the molten state was then brought into contact with a cooling roll controlled to a temperature of 85° C. to produce a film having a thickness of about 50 μm and a width of about 300 mm. Both edges in the extruding direction (longitudinal direction) of this film were slit to provide a central portion having a width of 200 mm as a product (semiconductive film). The results are shown in Tables 1 to 3.

Examples 2 to 4 and Comparative Examples 1 to 5

Films having a thickness of about 50 μm and a width of about 300 mm were formed in the same manner as in Example 1 except that the composition of the raw materials and film-forming conditions were changed as shown in Table 1. The results are shown in Tables 1 to 3. However, in the films obtained in Comparative Examples 2 to 4, irregularities in thickness occurred in their extruding direction (MD).

TABLE 1

| | | Composition [part by weight] | | Film-forming conditions | | | Modulus in tension [GPa] | | Tensile elongation at break [%] | |
|---|---|---|---|---|---|---|---|---|---|---|
| | | PEEK | Conductive carbon black | Lip clearance [mm] | Die temp. [° C.] | Temp. of cooling roll [° C.] | MD | TD | MD | TD |
| Example | 1 | 94.0 | 6.4 (KB) | 0.5 | 390 | 85 | 2.3 | 2.3 | >200 | >200 |
| | 2 | 93.0 | 7.5 (KB) | 0.5 | 390 | 85 | 2.4 | 2.4 | >200 | >200 |
| | 3 | 92.0 | 8.7 (KB) | 0.5 | 390 | 85 | 2.5 | 2.5 | >200 | >200 |
| | 4 | 85.0 | 17.6 (AB) | 0.5 | 390 | 85 | 2.5 | 2.5 | >200 | >200 |
| Comp. Example | 1 | 100.0 | — | 0.5 | 390 | 85 | 2.2 | 2.2 | >200 | >200 |
| | 2 | 93.0 | 7.5 (KB) | 1.5 | 390 | 85 | 2.4 | 2.4 | >200 | 120 |
| | 3 | 93.0 | 7.5 (KB) | 0.5 | 430 | 85 | 2.4 | 2.4 | >200 | >200 |
| | 4 | 93.0 | 7.5 (KB) | 0.5 | 390 | 210 | 3.5 | 3.5 | 50 | 5 |
| | 5 | 93.0 | 7.5 (KB) | 0.5 | 390 | 20 | 2.4 | 2.4 | >200 | >200 |

(Note)
(1) PEEK: Poly(ether ether ketone), product of Victrex Co., trade name "Victrex PEEK 450G",
(2) KB: Oil furnace black, product of Ketjen Black International, trade name "Ketjen Black EC", volatile matter = 0.5%, DBP oil absorption = 360 ml/100 g, pH = 9,
(3) AB: Acetylene black, product of Denki Kagaku Kogyo Kabushiki Kaisha, trade name "Denka Black", volatile matter = 0.03%, DBP oil absorption = 125 ml/100 g, pH = 9.

TABLE 2

| | | Thickness [μm] | | Volume resistivity [Ωcm] | |
|---|---|---|---|---|---|
| | | Average value | Max/min | Average value | Max/min |
| Example | 1 | 50 | 1.1 | $8.3 \times 10^{13}$ | 2.0 |
| | 2 | 48 | 1.1 | $2.3 \times 10^{13}$ | 3.5 |
| | 3 | 51 | 1.1 | $2.0 \times 10^{9}$ | 4.9 |
| | 4 | 52 | 1.1 | $2.1 \times 10^{12}$ | 3.4 |
| Comp. Example | 1 | 50 | 1.1 | $>1.0 \times 10^{14}$ | — |
| | 2 | 53 | 1.4 | $5.1 \times 10^{13}$ | 33.5 |
| | 3 | 48 | 1.5 | $6.6 \times 10^{11}$ | 35.0 |
| | 4 | 50 | 1.1 | $1.3 \times 10^{13}$ | 15.2 |
| | 5 | 53 | 1.6 | $9.1 \times 10^{12}$ | 46.0 |

TABLE 3

| | | Crystallization endotherm (ΔH) at 150-200° C. [J/g] | Number of reciprocating folds up to cutting in folding endurance test | | Tear strength [N] | |
|---|---|---|---|---|---|---|
| | | | MD | TD | MD | TD |
| Example | 1 | 22.1 | >20,000 | >20,000 | 0.29 | 0.29 |
| | 2 | 22.0 | >20,000 | >20,000 | 0.29 | 0.29 |
| | 3 | 21.9 | >20,000 | >20,000 | 0.27 | 0.27 |
| | 4 | 20.1 | >20,000 | >20,000 | 0.26 | 0.26 |
| Comp. Example | 1 | 27.0 | >20,000 | >20,000 | 0.30 | 0.30 |
| | 2 | 21.4 | >20,000 | >20,000 | 0.17 | 0.30 |
| | 3 | 19.8 | >20,000 | >20,000 | 0.28 | 0.28 |
| | 4 | No peak appeared | 2,500 | 1,800 | 0.32 | 0.37 |
| | 5 | 22.0 | >20,000 | >20,000 | 0.29 | 0.29 |

INDUSTRIAL APPLICABILITY

According to the present invention, there are provided semiconductive films that are formed from a resin composition comprising poly(ether ether ketone) and a conductive filler, narrow in scatters of both thickness and volume resistivity and markedly excellent in folding endurance (flexing resistance), and a production process thereof.

According to the present invention, there are also provided semiconductive films that are formed from a resin composition comprising poly(ether ether ketone) and a conductive filler, excellent in modulus in tension, tensile elongation and tensile strength in addition to the above-described properties, free of anisotropy in tear strength in their forming direction and also good in heat resistance and flame retardancy, and a production process thereof.

The semiconductive films according to the present invention can be suitably used as charge controlling members such as charging belts and transfer belts in image forming apparatus of an electrophotographic system or electrostatic recording system. The semiconductive films according to the present invention may also be used in application fields making good use of their antistatic property and anti-dust-collecting property as, for example, wall paper and sheathing materials for OA apparatus.

The invention claimed is:

1. A semiconductive film, wherein the semiconductive film is obtained by:

feeding a resin composition to an extruder, the resin composition comprising:

poly(ether ether ketone), at most 5 parts by weight, per 100 parts by weight of the poly(ether ether ketone), of other thermoplastic resins, and conductive carbon black having a DBP oil absorption within a range of 30 to 700 ml/100 g in a proportion of 5 to 40 parts by weight per 100 parts by weight of the poly(ether ether ketone), melt-extruding the resin composition in the form of a film from a die, the lip clearance of which has been controlled to at most 1.0 mm, and then cooling and solidifying the film in a molten state at a cooling temperature in a range of 60 to 120° C., wherein the semiconductive film has a degree of crystallinity of poly(ether ether ketone) and the following properties (a) to (c):

(a) the average value of its thickness being within a range of 30 to 250 μm, and the maximum value of the thickness being within a range of 1 to 1.3 times as much as the minimum value thereof, (b) the average value of its volume resistivity being within a range of $1.0 \times 10^2$ to $1.0 \times 10^{14}$ Ωcm, and the maximum value of the volume resistivity being within a range of 1 to 10 times as much as the minimum value thereof, and (c) the number of reciprocating folds required up to cutting as determined by using a strip-like specimen having a width of 15 mm under conditions of a chuck bending angle of 135° right and left, a folding speed of 175 c/s and a load of 9.8 N per 100 μm of a thickness in accordance with "Testing Method for Folding Endurance by MIT Tester" as prescribed in JIS P 8115 being at least 10,000 times, and wherein the poly(ether ether ketone) is a homopolymer having a structural unit (repeating unit) represented by the following formula (1):

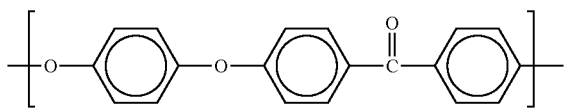

(1)

or is a copolymer having the structural unit represent by the formula (1), and a structural unit represented by the following formula (2):

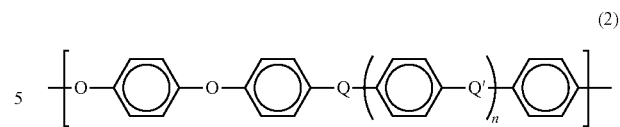

(2)

wherein Q and Q' may be the same or different from each other and are individually —CO— or —SO$_2$—, and n is 0 or 1, and/or a structural unit represented by the following formula (3):

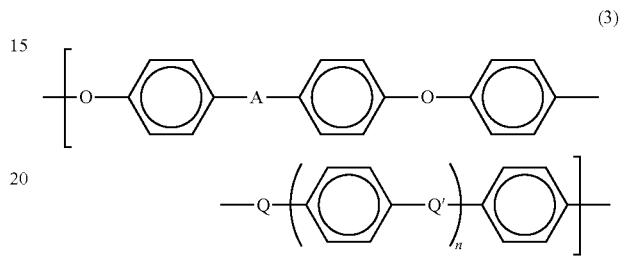

(3)

wherein A is a divalent lower aliphatic hydrocarbon group, Q and Q' may be the same or different from each other and are individually —CO— or —SO$_2$—, and n is 0 or 1, and wherein the proportion of the structural units represented by the formulae (2) and (3) in the copolymer is at most 10 mol %.

2. The semiconductive film according to claim 1, which further has property (d) that the tensile elongation at break in its any direction is at least 10% as measured by using a specimen having a width of 10 mm and a length of 100 mm under conditions of a crosshead speed of 50 mm/min and an interchuck interval of 50 mm by means of a tensile tester in accordance with JIS K 7113.

3. The semiconductive film according to claim 1, which further has property (e) that the modulus in tension in its any direction is at least 1.8 GPa as measured by using a specimen having a width of 10 mm and a length of 100 mm under conditions of a crosshead speed of 50 mm/min and an interchuck interval of 50 mm by means of a tensile tester in accordance with JIS K 7113.

4. The semiconductive film according to claim 1, which further has property (f) that a ratio (M/T) of tear strength (M) in the extruding direction (MD) of the film to tear strength (T) in a direction (TD) perpendicular to the extruding direction as determined in accordance with JIS K 6252 is within a range of 2/3 to 3/2.

5. The semiconductive film according to claim 1, wherein the conductive carbon black has a volatile matter content of at most 1.5% by weight.

6. The semiconductive film according to claim 1, wherein the conductive carbon black has a volume resistivity lower than $10^2$ Ωcm.

7. The semiconductive film according to claim 1, wherein the conductive carbon black is acetylene black or oil furnace black or a mixture thereof.

8. A charge controlling member formed with the semiconductive film according to claim 1.

9. The charge controlling member according to claim 8, which is a semiconductive covered roller obtained by covering a roller base with a tube formed from the semiconductive film.

10. The charge controlling member according to claim 8, which is a semiconductive belt formed from the semiconductive film.

11. The semiconductive film according to claim 1, wherein the conductive carbon black has a DBP oil absorption within a range of 100 to 400 ml/100g.

12. The semiconductive film according to claim 1, wherein the maximum value of the volume resistivity being within a range of 1 to 5 times as much as the minimum value thereof.

13. The semiconductive film according to claim 1, wherein the number of reciprocating folds is at least 20,000 times.

14. The semiconductive film according to claim 1, wherein the semiconductor film is obtained by feeding the resin composition to the extruder, melt-extruding the resin composition in the form of a film from the die, the lip clearance of which has been controlled to at most 1.0 mm, and then cooling and solidifying the film in a molten state by a cooling temperature in a range of 70 to 100° C.

15. The semiconductive film according to claim 1, wherein the semiconductor film is obtained by feeding the resin composition to the extruder, melt-extruding the resin composition in the form of a film from the die, the lip clearance of which has been controlled to at most 1.0 mm, and then cooling and solidifying the film in a molten state by a cooling temperature in a range of 80 to 90° C.

16. The semiconductive film according to claim 1, wherein the semiconductor film exhibits an endothermic peak with a crystallization endotherm ($\Delta H$) of at least 10 J/g, detected within a range of 150 to 200° C. by thermal analysis by differential scanning analysis (DSC).

* * * * *